(12) United States Patent
Everitt

(10) Patent No.: US 7,886,116 B1
(45) Date of Patent: Feb. 8, 2011

(54) BANDWIDTH COMPRESSION FOR SHADER ENGINE STORE OPERATIONS

(75) Inventor: Cass W. Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 565 days.

(21) Appl. No.: 11/830,778

(22) Filed: Jul. 30, 2007

(51) Int. Cl.
 *G06F 12/00* (2006.01)
 *G06F 17/00* (2006.01)
 *G06K 9/36* (2006.01)

(52) U.S. Cl. .................. 711/154; 711/140; 711/173; 707/693; 382/232

(58) Field of Classification Search .................. 711/140
See application file for complete search history.

(56) References Cited

U.S. PATENT DOCUMENTS

| | | | |
|---|---|---|---|
| 5,764,228 A * | 6/1998 | Baldwin ..................... 715/797 |
| 6,239,810 B1 * | 5/2001 | Van Hook et al. ........... 345/420 |
| 6,724,394 B1 * | 4/2004 | Zatz et al. ................... 345/581 |
| 6,999,088 B1 * | 2/2006 | Van Dyke et al. ........... 345/544 |
| 6,961,060 B1 | 11/2006 | Mochizuki et al. |
| 2002/0130874 A1 * | 9/2002 | Baldwin ..................... 345/506 |
| 2003/0137528 A1 * | 7/2003 | Wasserman et al. ......... 345/700 |
| 2003/0164830 A1 * | 9/2003 | Kent .......................... 345/505 |
| 2006/0152519 A1 * | 7/2006 | Hutchins et al. ............ 345/561 |
| 2007/0294329 A1 * | 12/2007 | Hussain ..................... 708/300 |
| 2007/0297501 A1 | 12/2007 | Hussain et al. |
| 2008/0010596 A1 * | 1/2008 | Hussain et al. ............. 715/718 |
| 2008/0050027 A1 * | 2/2008 | Bashyam et al. ........... 382/238 |

FOREIGN PATENT DOCUMENTS

JP 2001103473 A * 4/2001

OTHER PUBLICATIONS

Office Action, U.S. Appl. No. 11/830,776 dated Sep. 2, 2010.

* cited by examiner

*Primary Examiner*—Jack A Lane
(74) *Attorney, Agent, or Firm*—Patterson & Sheridan, LLP.

(57) ABSTRACT

Embodiments of the present invention set forth systems and methods for compressing thread group data written to frame buffer memory to increase overall memory performance. A compression/decompression engine within the frame buffer memory interface includes logic configured to identify situations where the threads of a thread group are writing similar scalar values to memory. Upon recognizing such a situation, the engine is configured to compress the scalar data into a form that allows all of the scalar data to be written to or read from the frame buffer memory in fewer clock cycles than would be required to transmit the data in uncompressed form to or from memory. Consequently, the disclosed systems and methods are able to effectively increase memory performance when executing thread group STORE and LOAD operations.

16 Claims, 8 Drawing Sheets

BANDWIDTH COMPRESSION FOR SHADER ENGINE STORE OPERATIONS

BACKGROUND OF THE INVENTION

1. Field of the Invention

Embodiments of the present invention generally relate to a parallel and pipelined graphics architecture and, more specifically, to a bandwidth compression for shader engine store operations.

2. Description of the Related Art

Graphics systems may adopt a highly parallel and pipelined architecture to meet the ever increasing demands for realism, quality, and real-time interactivity of displayed images and videos. Therefore, some graphics processing units ("GPU") may include a plurality of streaming multiprocessors (also commonly referred to as "shader engines"), each of which is configured with a single-instruction, multiple-data ("SIMD") architecture and capable of executing a single instruction across different data being processed within multiple streaming processors included within the streaming multiprocessor. The series of instructions issued to a single streaming processor is referred to herein as a "thread," and a collection of concurrently executing threads among the streaming processors within the streaming multiprocessor is referred to herein as a "thread group." Additionally, several thread groups may be active (in different phases of execution) at the same time on a given streaming multiprocessor, resulting in a large number of threads executed in one streaming multiprocessor every clock cycle. For example, a streaming multiprocessor supporting 24 active thread groups at the same time, with each thread group including 32 threads, may execute 768 threads per clock cycle. Thus, for a GPU that includes several streaming multiprocessors, the number of threads executing every clock cycle may quickly rise to several thousand.

Each instruction executed by a streaming multiprocessor may perform arithmetic, logical and/or memory operations, including write ("STORE") and read ("LOAD") operations to and from the frame buffer memory. The streaming multiprocessors and the frame buffer memory for the GPU commonly reside in different chips, requiring all frame buffer accesses to be conducted over a chip-to-chip interconnect. The interface between the graphics rendering engine and the external memory devices making up the frame buffer is referred to herein as the "frame buffer interface," and the data bandwidth of the frame buffer interface is referred to herein as the "memory bandwidth." Depending on the design, 4B of memory bandwidth is required for each thread to carry out a STORE or LOAD operation where scalar data is written to or read from the frame buffer memory. In such a case, a thread group that includes 32 threads would require 128B of memory bandwidth to support 32 simultaneous write or read operations to the frame buffer memory. Further, depending on the design, a single chip-to-chip interconnect may transmit 16B of data per clock cycle. Thus, eight clock cycles would be required for all 32 threads to write or read their respective scalar data to or from the frame buffer memory. Even though the frame buffer interface may include several chip-to-chip interconnects connecting streaming multiprocessors with different partitions of the frame buffer memory, the data bandwidth necessary to accommodate the read/write requests from the potentially thousands of threads executing across the different streaming multiprocessors is usually much greater than the available memory bandwidth. As a result, the unprocessed read/write requests may accumulate at the frame buffer interface, substantially limiting the memory-related performance of the graphics system.

As the foregoing illustrates, what is needed in the art is a technique that effectively increases memory bandwidth for performing STORE and LOAD operations for a thread group.

SUMMARY OF THE INVENTION

One embodiment of the present invention sets forth a method for compressing data for a thread group STORE operation. The method includes receiving uncompressed thread group data from a thread group executing within a shader engine, where the thread group includes a plurality of simultaneously executing threads, and the uncompressed thread group data may be written to a memory partition within a frame buffer memory in a first number of subpackets, each subpacket representing an amount of data that can be written to the memory partition in one clock cycle, determining that the thread group data is compressible, compressing the thread group data into a second number of subpackets, where the second number of subpackets is less than the first number of subpackets, and writing each of the second number of subpackets to the memory partition.

One advantage of the disclosed method is that it enables less data to be written to and read from the frame buffer memory when performing thread group STORE and LOAD operations, thereby improving overall memory performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
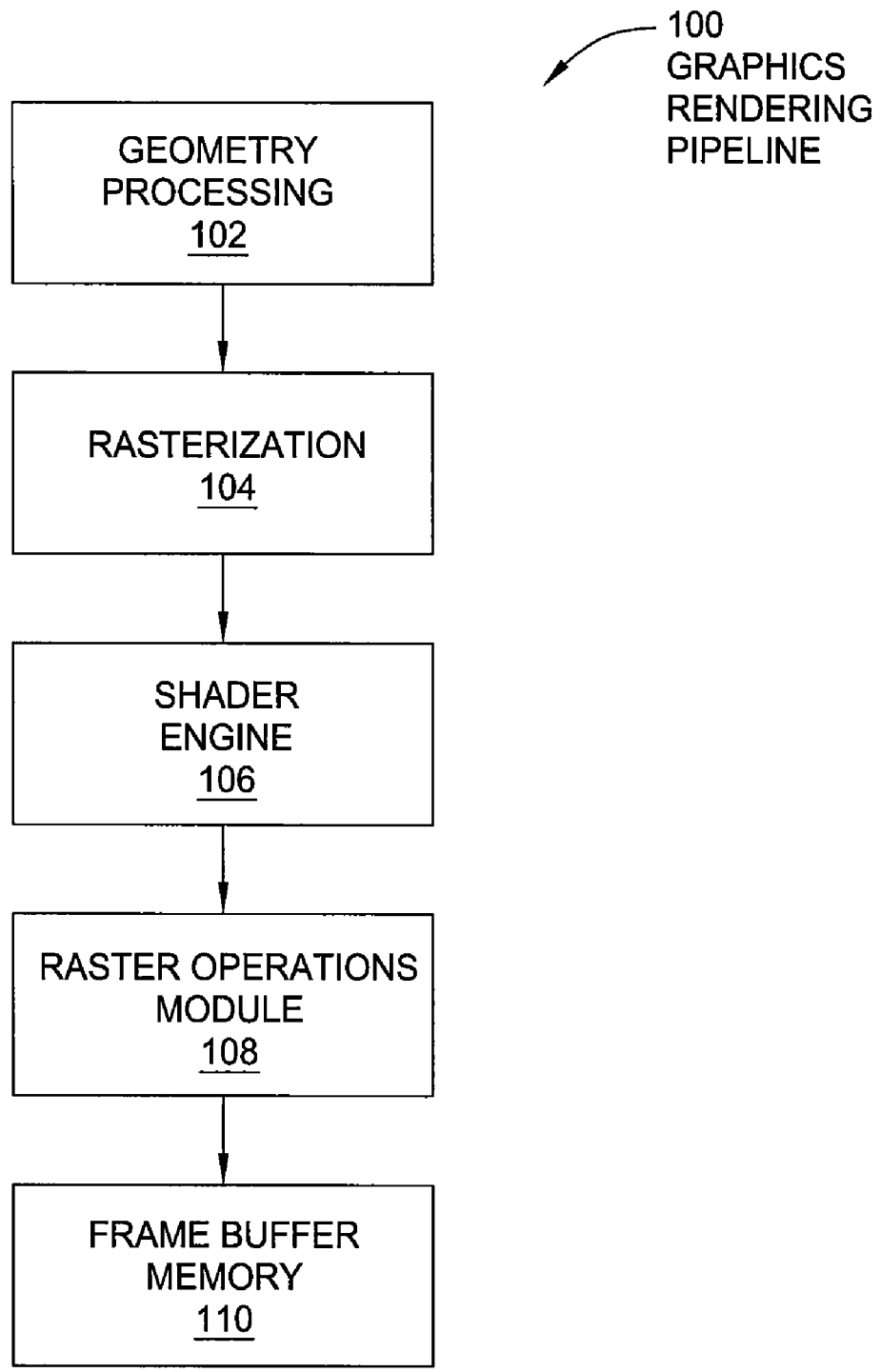
FIG. 1 is a conceptual diagram of a graphics rendering pipeline, according to one embodiments of the present invention.

FIG. 1 is a conceptual diagram of a graphics rendering pipeline 100, according to one embodiments of the present invention. Geometry processing block 102 receives geometry primitives, typically triangles, from a graphics application and conducts geometric transforms as specified by the graphics application. The output of geometry processing block 102 includes triangles transformed and projected onto a two dimensional surface, referred to as "screen space," corresponding to a window on the viewer's screen. The geometric primitives in screen space emitted by geometry processing block 102 are decomposed by rasterization block 104 into fragments, corresponding to screen space pixels that are least partially covered by the geometric primitives. Additionally, rasterization block 104 determines the screen space coverage and alignment of each geometric primitive with respect to memory tiles, each of which refers to a contiguous span of memory within a certain partition of frame buffer memory 110. A shader engine 106 receives fragments from rasterization block 104 and processes the fragments according to shading instructions specified by the graphics application or otherwise. The processed fragments are transmitted, as described in more detail below, to a Raster OPerations ("ROP") module 108 for further processing. The ROP module 108 conducts any depth and stencil testing on the shaded pixels, as specified by the graphics application. Pixels surviving depth and stencil testing are written to frame buffer memory 110. Video refresh unit (not shown) then scans out the data stored in the frame buffer memory 110 to a display device.

Figure 2:
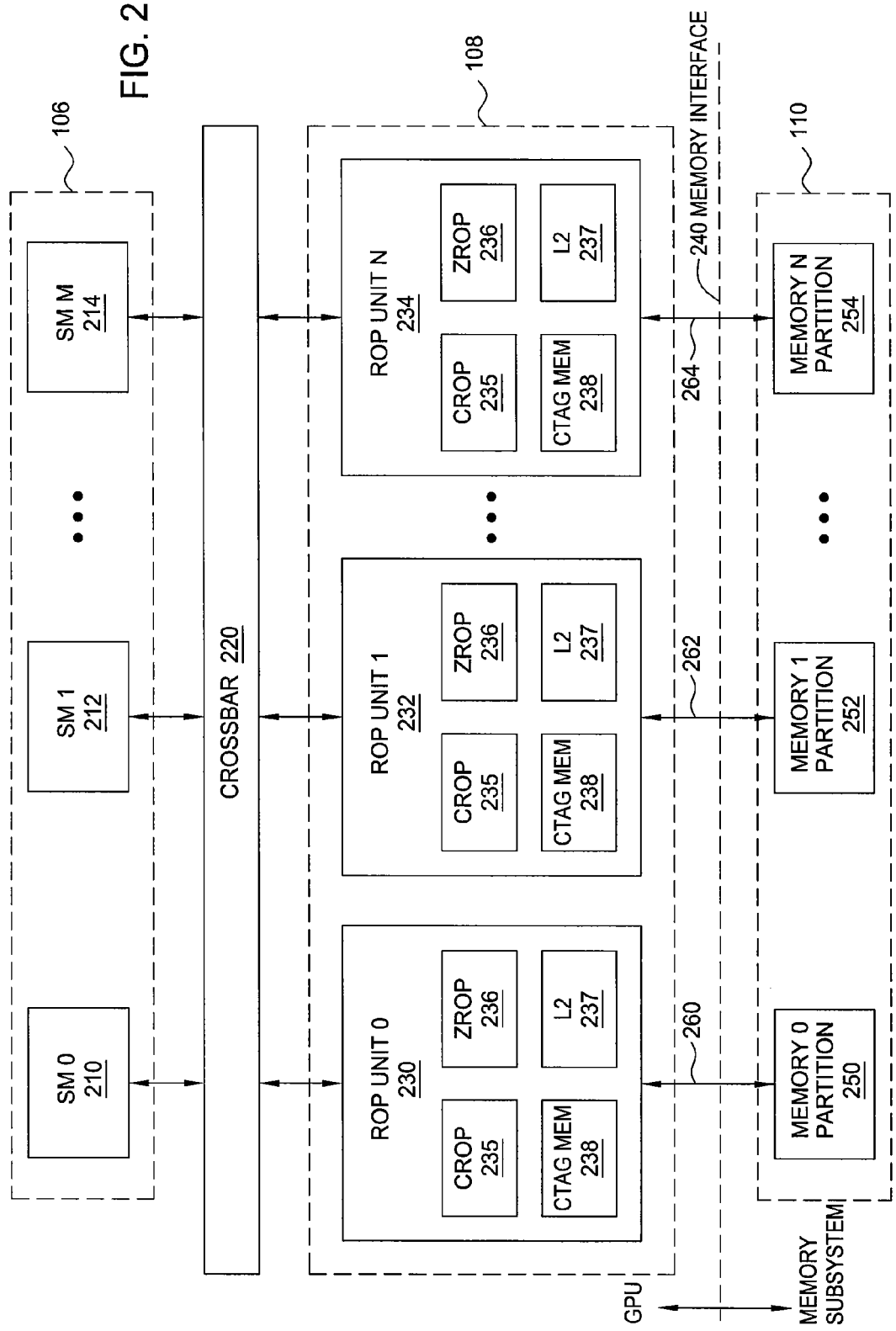
FIG. 2 is a conceptual diagram of a graphics rendering pipeline architecture that routes data from M streaming multiprocessors to N frame buffer memory partitions, according to one embodiment of the present invention.

FIG. 2 is a conceptual diagram of a graphics rendering pipeline architecture that routes data from M streaming multiprocessors to N frame buffer memory partitions, according to one embodiment of the present invention. The shader engine 106 may include multiple streaming multiprocessors ("SM") operating in parallel, shown as SM 0 210, SM 1 212, and SM M 214. As previously described herein, one or more thread groups executes on each SM, and the data processed by the different thread groups (referred to herein as "thread group data") is directed to the ROP module 108 for further processing and storage to the frame buffer memory 110. In other embodiments, different numbers of streaming multiprocessors may be included within the shader engine 106. The frame buffer (FB) memory 110 may include multiple FB memory partitions, shown as memory partition 0 250, memory partition 1 252, and memory partition N 254. In other embodiments, different numbers of memory partitions may be included within the FB memory 110.

The ROP module 108 may also include multiple ROP units operating in parallel, shown as ROP unit 0 230, ROP unit 1 232, and ROP unit N 234. Each ROP unit corresponds to a particular memory partition in the frame buffer memory 110. For M SMs to transfer data to N ROP units efficiently, a crossbar 220 is used to route data from any one of the M SMs to any one of the N ROP units. For example, suppose SM 0 needs to send thread group data to ROP unit 1 because the target surface related to the thread group data resides in the memory partition corresponding to ROP unit 1. SM 0 would send a transaction request corresponding to the thread group data to the crossbar 220, and the crossbar 220 would arbitrate among the various transaction requests generated by the SMs within the shader engine 106 to route the thread group data to ROP unit 1.

Each of the ROP units 230, 232, and 234 includes a CROP subunit 235, a ZROP subunit 236, an L2 subunit 237, and a CTAG MEM (compression tag memory) unit 238. The CROP subunit and the ZROP subunit are configured to perform raster operations on color and z data, respectively, such as stencil, z test, and the like, while the L2 subunit is configured to perform various shading operations on texture data. Each of the CROP subunit, the ZROP subunit, and the L2 subunit includes logic to compress and decompress color, z, and texture data, respectively, being written to and read from the frame buffer memory 110, as described in greater detail herein. Each CTAG MEM unit within a particular ROP unit is configured to store compression tags associated with thread group data written to and read from the memory partition corresponding to the ROP unit by the CROP subunit, the ZROP subunit, or the L2 subunit within that same ROP unit.

Figure 3:
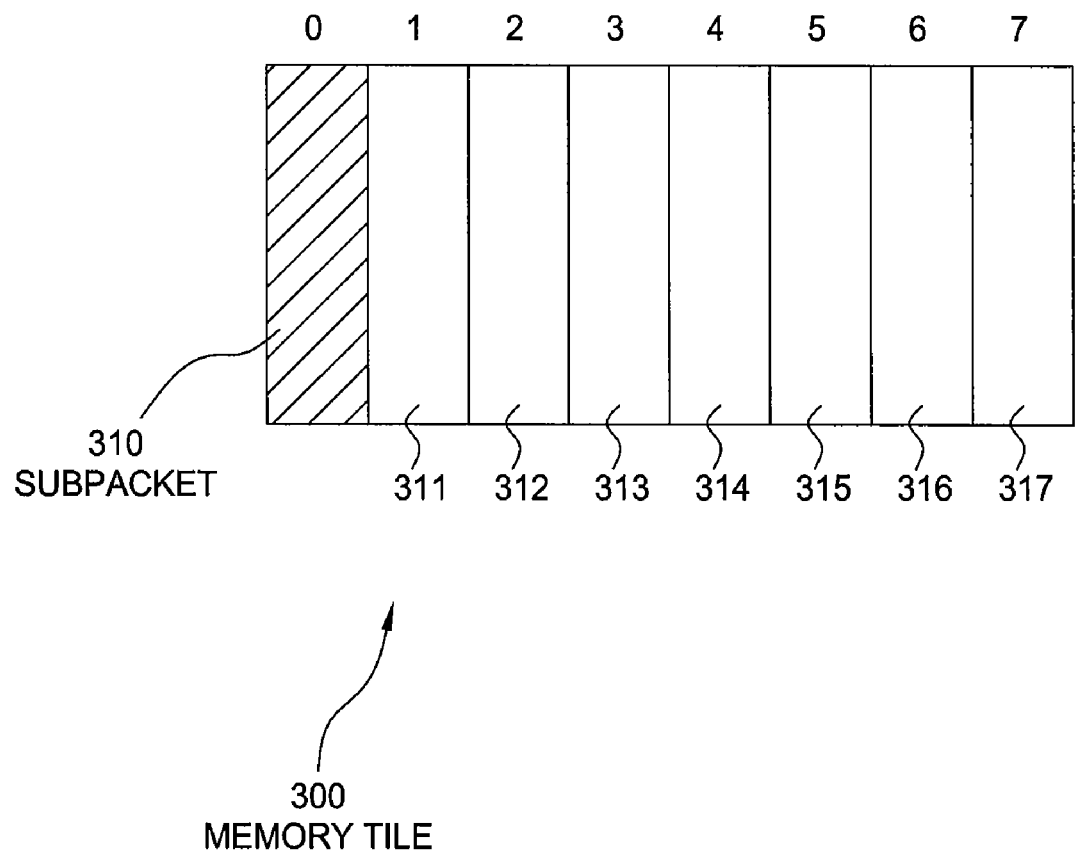
FIG. 3 is a conceptual illustration of a memory tile, according to one embodiment of the present invention.

As shown in FIG. 2 by a memory interface 240, the ROP module 108, the crossbar 220, and the shader engine 106 reside within the GPU on one chip, while the FB memory 110 resides within a memory subsystem on a different chip. Each of the ROP units 230, 232, and 234 is connected to the memory partitions 250, 252, and 254, respectively, with chip-to-chip interconnects 260, 262, and 264. Each of the memory partitions 250, 252, and 254 is divided into multiple memory tiles contiguous memory. Each memory tile is further divided into subpackets, where each subpacket represents the amount of data that can be transmitted from a ROP unit to a memory partition through the chip-to-chip interconnect in one clock cycle. FIG. 3 is a conceptual illustration of a memory tile 300, according to one embodiment of the present invention. As shown, the memory tile 300 is divided into 8 subpackets 310-317. In one embodiment each subpacket 310-317 may contain up to 16B of data. Thus, in such an embodiment, the memory tile 300 may accommodate 128B of data, and, as previously described herein, eight clock cycles are required to transmit this amount of thread group data between the memory partition containing the memory tile 300 and the corresponding ROP unit within the ROP module 108 when the thread group data is uncompressed. In alternative embodiments, the memory tiles within the memory partitions and the subpackets making up the memory tiles can have different sizes, depending on the design of the ROP units, the memory partitions, and the chip-to-chip interconnects connecting the ROP units to the memory partitions.

Figure 4:
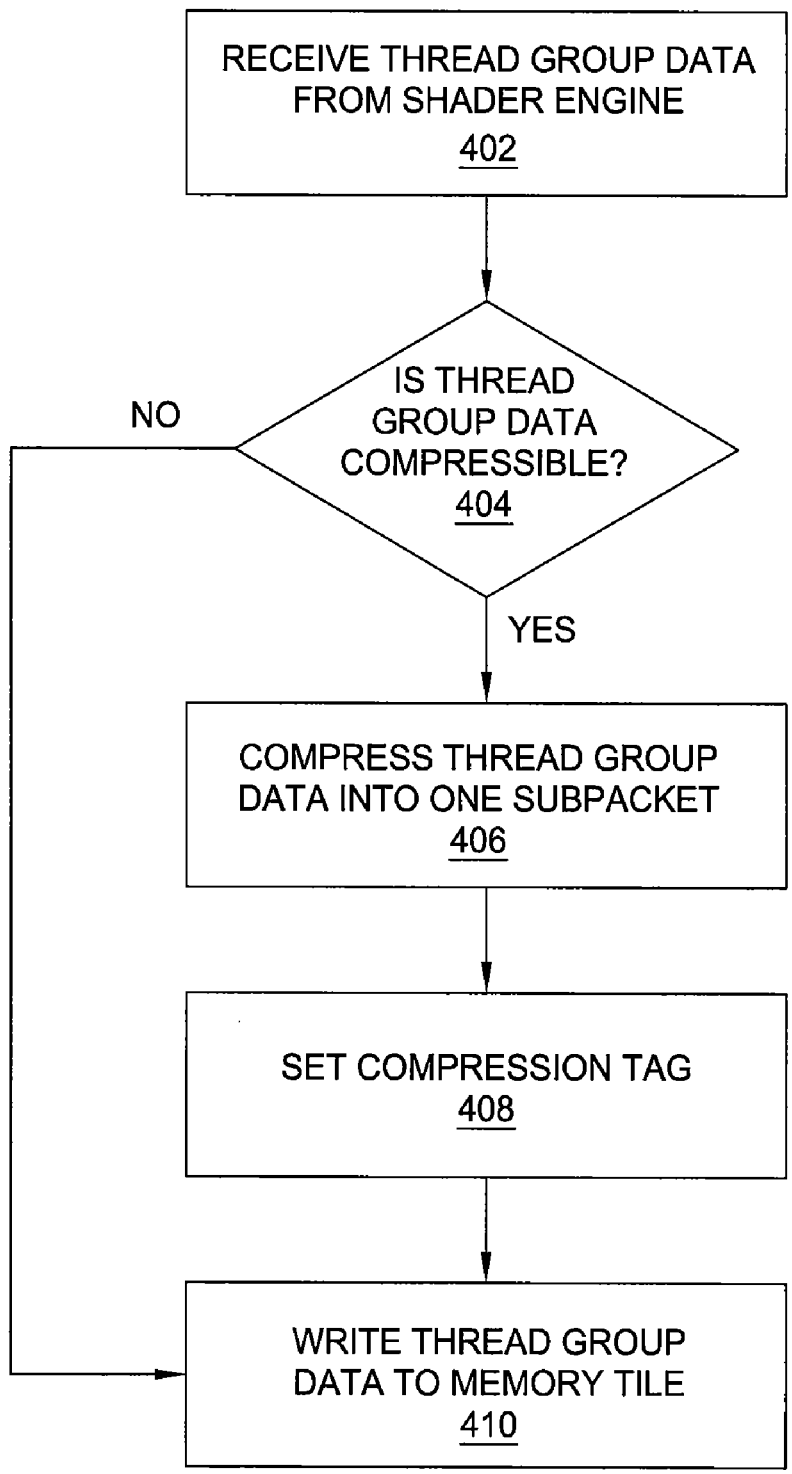
FIG. 4 sets forth a flow diagram of method steps for compressing data for a thread group STORE operation, according to one embodiment of the present invention.

FIG. 4 sets forth a flow diagram of method steps for compressing data for a thread group STORE operation, according to one embodiment of the present invention. Although the method steps are described in conjunction with the system of FIGS. 1 and 2, persons skilled in the art will understand that any system that performs the method steps, in any order, is within the scope of the invention. Furthermore, while the method steps are described in conjunction with ROP unit 230 of FIG. 2, the teachings of FIG. 4 apply with equal force to any of the ROP units within the ROP module 108.

Figure 6:
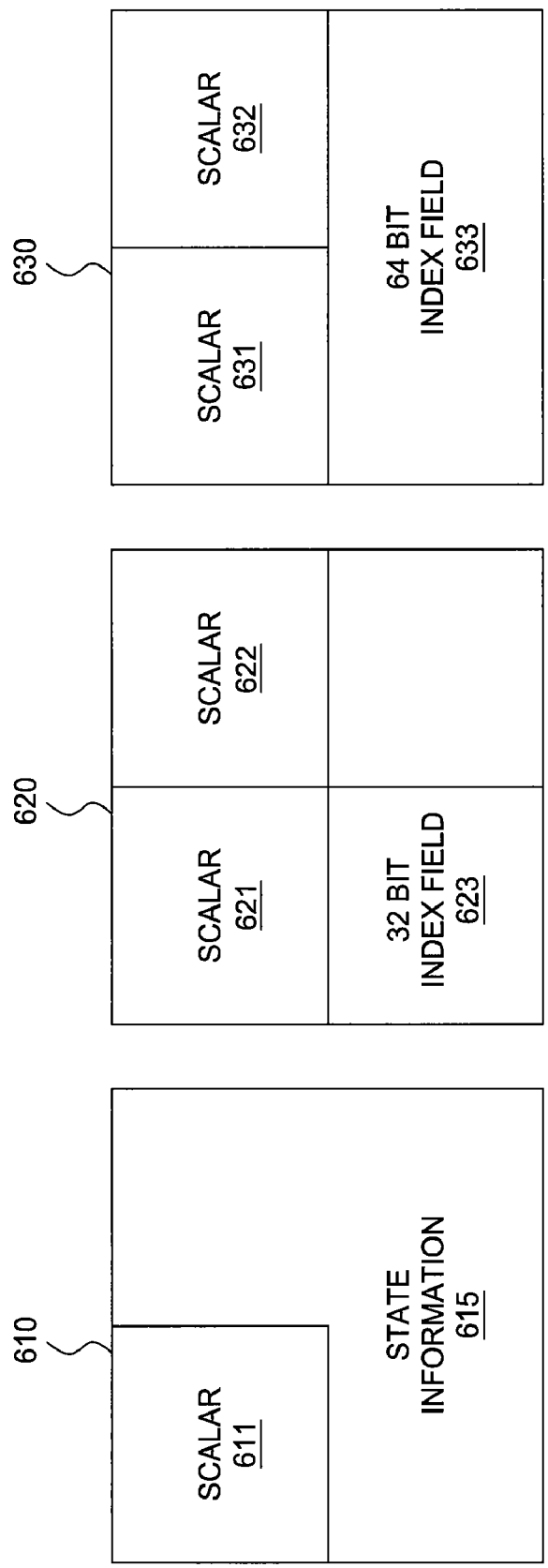
FIGS. 6A-6C illustrate examples of how subpackets that include compressed thread group data may be configured using different compression schemes, according to different embodiments of the present invention.

The method for compressing data begins in step 402, where the ROP unit 230 receives thread group data from one of the SMs within the shader engine 106 to be written to the memory partition 250. As previously described herein, if the thread group data is color data, then the data is transmitted to the CROP subunit 235, if the thread group data is z data, then the data is transmitted to the ZROP subunit 236, and if the thread group data is texture data, then the data is transmitted to the L2 subunit 237. The method then proceeds to step 404, where the subunit within the ROP unit 230 that receives the thread group data determines whether the data is compressible. As described in greater detail in FIGS. 6A-6C, the thread group data is said to be "compressible" if, in various embodiments, the threads in the thread group are writing only one, two, or four distinct scalar values to the memory partition 250. If, in step 404, the subunit within the ROP unit 230 determines that the thread group data is compressible, the method proceeds to step 406. In step 406, the subunit compresses the thread group data into one subpacket using a predetermined compression scheme. Again, FIGS. 6A to 6C set forth three exemplary compression schemes, but, in alternative embodiments, any compression scheme that reduces the thread group data to one subpacket such that the data may be written to the frame buffer memory 110 in one clock cycle may be used.

Once the thread group data has been compressed, the method proceeds to step 408, where the subunit within the ROP unit 230 sets a compression tag in the CTAG MEM unit 238 associated with the memory address of the memory tile to which the compressed thread group data is being written. During subsequent thread group LOAD operations, having a compression tag per memory tile allows a quick determination of whether the data stored at a particular memory tile location has been compressed or not. In step 410 the subunit within the ROP unit 230 writes the compressed thread group data to a memory tile location within the memory partition 250. Again, since the thread group data has been compressed to one subpacket, the data may be written to the memory partition 250 in one clock cycle. By contrast, if in step 404 the subunit within the ROP unit 230 determines that the thread group data is not compressible, then, in step 410, the subunit writes the uncompressed thread group data to the memory partition 250 over several clock cycles.

Figure 5:
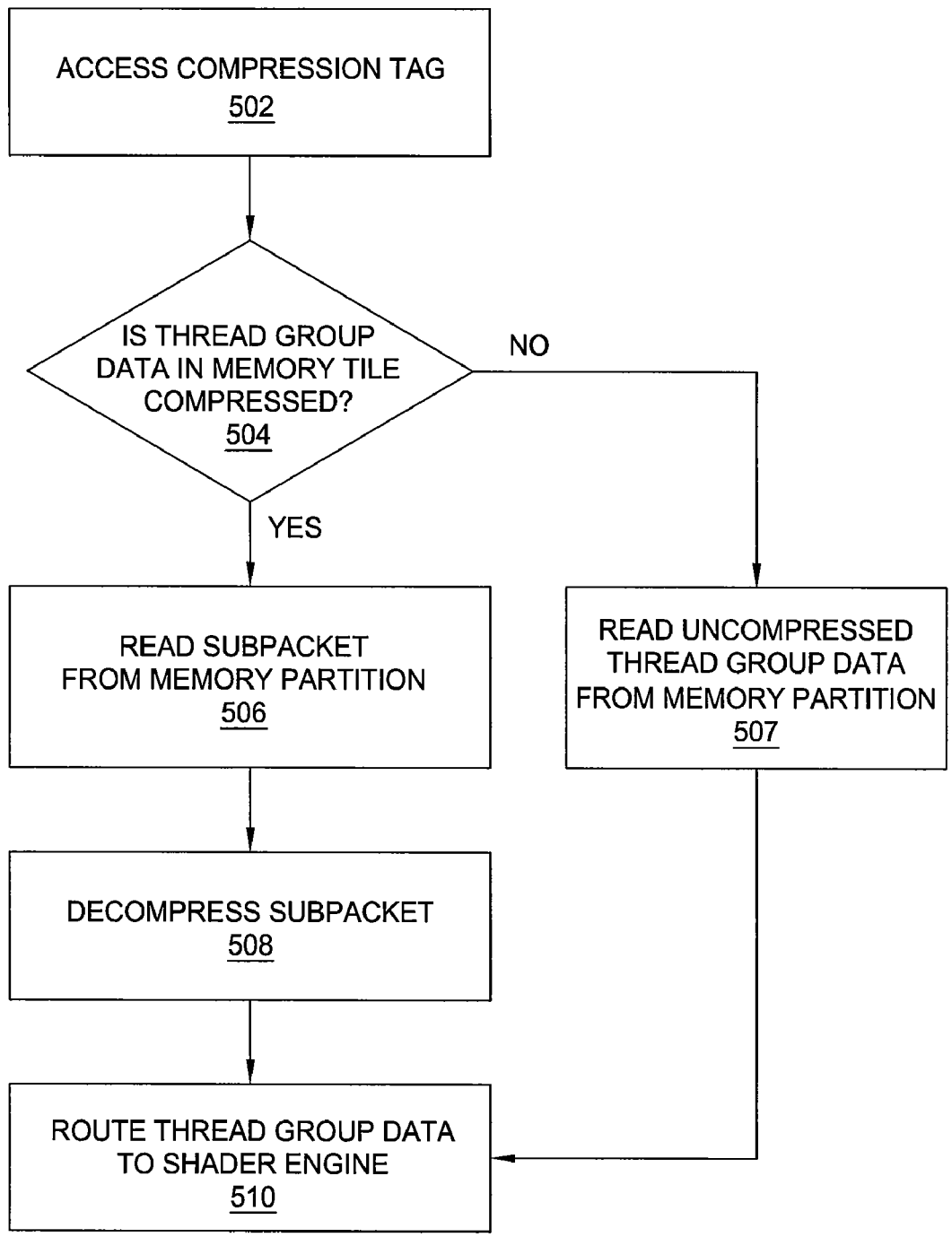
FIG. 5 sets forth a flow diagram of method steps for decompressing data for a thread group LOAD operation, according to one embodiment of the present invention.

FIG. 5 sets forth a flow diagram of method steps for decompressing data for a thread group LOAD operation, according to one embodiment of the present invention. Although the method steps are described in conjunction with the system of FIGS. 1 and 2, persons skilled in the art will understand that any system that performs the method steps, in any order, is within the scope of the invention. Furthermore, while the method steps are described in conjunction with ROP unit 230 of FIG. 2, the teachings of FIG. 5 apply with equal force to any of the ROP units within the ROP module 108.

The method for decompressing data begins when the ROP unit 230 receives a request from the shader engine 106 to read thread group data from a particular memory tile location within the memory partition 250. Again, if the requested thread group data is color data, then the CROP subunit 235 receives the read request, if the requested thread group data is z data, then the ZROP subunit 236 receives the read request, and if the requested thread group data is texture data, then the L2 subunit 237 receives the read request. In step 502, the subunit that receives the read request accesses the compression tag within the CTAG MEM unit 238 associated with the memory tile location where the thread group data is stored. In step 504, the subunit determines whether the thread group data is compressed based on the setting of the compression tag. If the thread group data is compressed, then, in step 506, the subunit reads the subpacket at the memory tile location within the memory partition 250 that contains all of the thread group data. As previously described herein, since the thread group data has been compressed to one subpacket, the data may be read from the memory partition 250 in one clock cycle.

The method then proceeds to step 508, where the subunit within the ROP unit 230 decompresses the thread group data contained in the subpacket. In step 510, the subunit transmits the uncompressed thread group data via the crossbar 220 to the SM within the shader engine 106 that requested the thread group data.

Returning now to step 504, if the subunit within the ROP unit 230 determines that the thread group data uncompressed, then the method proceeds to step 507. In step 507, the subunit reads the uncompressed thread group data at the memory tile location within the memory partition 250 over several clock cycles, as also previously described herein. The method then proceeds to step 510, where the uncompressed data is transmitted to the shader engine 106, as described above.

FIGS. 6A-6C illustrate examples of how subpackets that include compressed thread group data may be configured using different compression schemes, according to different embodiments of the present invention. In these embodiments, it is assumed that each thread group includes 32 threads, where each thread simultaneously writes or reads one 4B scalar value to or from the FB memory 110. Therefore, unless the thread group data is compressed, such write or read operations require 128B of memory bandwidth. When each of the chip-to-chip interconnects 260, 262, and 264 of FIG. 2 is able to transmit 16B of data to or from the frame buffer memory 110 per clock cycle, 8 clock cycles are required to complete each write or read operation. However, in some cases, all of the threads in the thread group write only one, two, or four distinct scalar values to the frame buffer memory 110. In such cases, as described in step 404 of FIG. 4, the various subunits within the ROP unit (i.e., the CROP subunit, the ZROP subunit, and the L2 subunit) are configured to determine that the thread group data is compressible and implement one of the compression schemes described below to compress the thread group data into one subpacket such that the data may be written to and subsequently read from the frame buffer memory 110 in only one clock cycle.

FIG. 6A illustrates an example of how a subpacket 610 may be configured when each thread of a thread group writes the same scalar value to a memory tile. As shown, the subpacket 610 includes, without limitation, a scalar 611 occupying 4B of memory and sufficient state information 615 to communicate to the various hardware components that each thread in the thread group has written the scalar 611 to the FB memory 110. Since the total amount of data included in the subpacket 610 is less than 16B, the subpacket may be written to or read from the FB memory 110 in one clock cycle, resulting in 8:1 memory bandwidth savings. This type of compression scheme may be used, for example, when each thread writes a scalar value of zero to the FB memory 110 when initializing the FB memory 110.

FIG. 6B illustrates an example of how a subpacket 620 may be configured when each thread in a thread group writes one of two different scalar values to a memory tile. As shown, the subpacket 620 includes, without limitation, a scalar 621 and a scalar 622, each occupying 4B of memory. The subpacket 620 further includes a 32-bit index field 623, which contains 32 1*b* indices, where each index corresponds to one of the 32 threads in the thread group. Each index may be set to indicate which one of the two scalar values 621 and 622 the thread corresponding to the index is writing to the FB memory 110. For example, a first setting may indicate that the corresponding thread is writing the scalar 621 to the memory tile, and a second setting may indicate that the corresponding thread is writing the scalar 622 to the memory tile. Since the total amount of data included in the subpacket 620 is less than 16B, the subpacket may be written to or read from the FB memory 110 in one clock cycle, resulting in 8:1 memory bandwidth savings.

FIG. 6C illustrates an example of how a subpacket 630 may be configured when each thread in a thread group writes one of four different scalar values to a memory tile. As shown, the subpacket 630 includes, without limitation, a scalar 631 and a scalar 632, each occupying 4B of memory. The subpacket 630 further includes a 64-bit index field 633, which contains 32 2b indices, where each index corresponds to one of the 32 threads in the thread group. Since the index corresponding to each thread is 2b, an index may have four settings to indicate which one of the four scalar values the thread corresponding to the index is writing to the FB memory 110. A first setting may indicate that the corresponding thread is writing the scalar 631 to the memory tile, a second setting may indicate that the corresponding thread is writing the scalar 632 to the memory tile, a third setting may indicate that the corresponding thread is writing a first specially predetermined scalar value to the memory tile, and a fourth setting may indicate that the corresponding thread is writing a second specially predetermined scalar value to the memory tile. Since the total amount of data included in the subpacket 630 is 16B, the subpacket may be written to and read from the FB memory 110 in one clock cycle, again resulting in 8:1 memory bandwidth savings.

Persons skilled in the art will appreciate that, in other embodiments, a thread group may include any number of threads and each thread may write and read scalar data of various sizes to and from the frame buffer memory 110. Further, as previously described, a subpacket and a memory tile can be any size, and any technically feasible compression scheme may be used, so long as the compressed thread group data being written to or read from the frame buffer memory 110 can be transmitted across the chip-to-chip interconnect.

Figure 7:
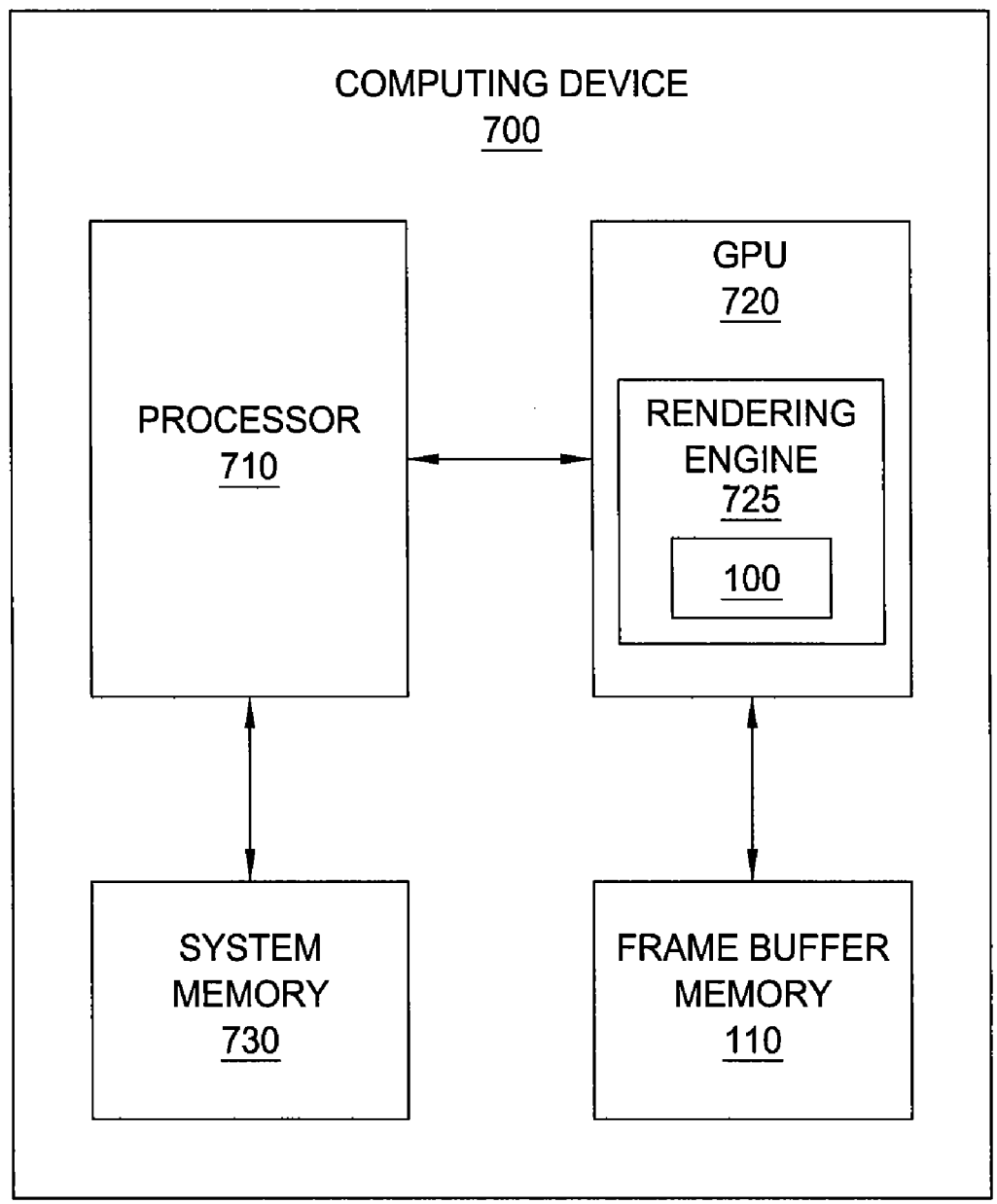
FIG. 7 is a conceptual diagram of a computing device configured to implement one or more embodiments of the present invention.

FIG. 7 is a conceptual diagram of a computing device 700 configured to implement one or more embodiments of the present invention. As shown, the computing device 700 includes, without limitation, a processor 710, a graphics processing unit ("GPU") 720, a system memory 730, and the frame buffer memory 110 coupled to the GPU 720. The GPU 720 includes at least one rendering engine 725 used to process data. The rendering engine 725 includes at least one graphics rendering pipeline 100, as described above, that implements the memory bandwidth compression schemes described in FIGS. 2-6 above. Persons skilled in the art will recognize that any system having one or more processing units configured to implement the teachings disclosed herein falls within the scope of the present invention. Thus, the architecture of computing device 700 in no way limits the scope of the present invention.

Figure 8:
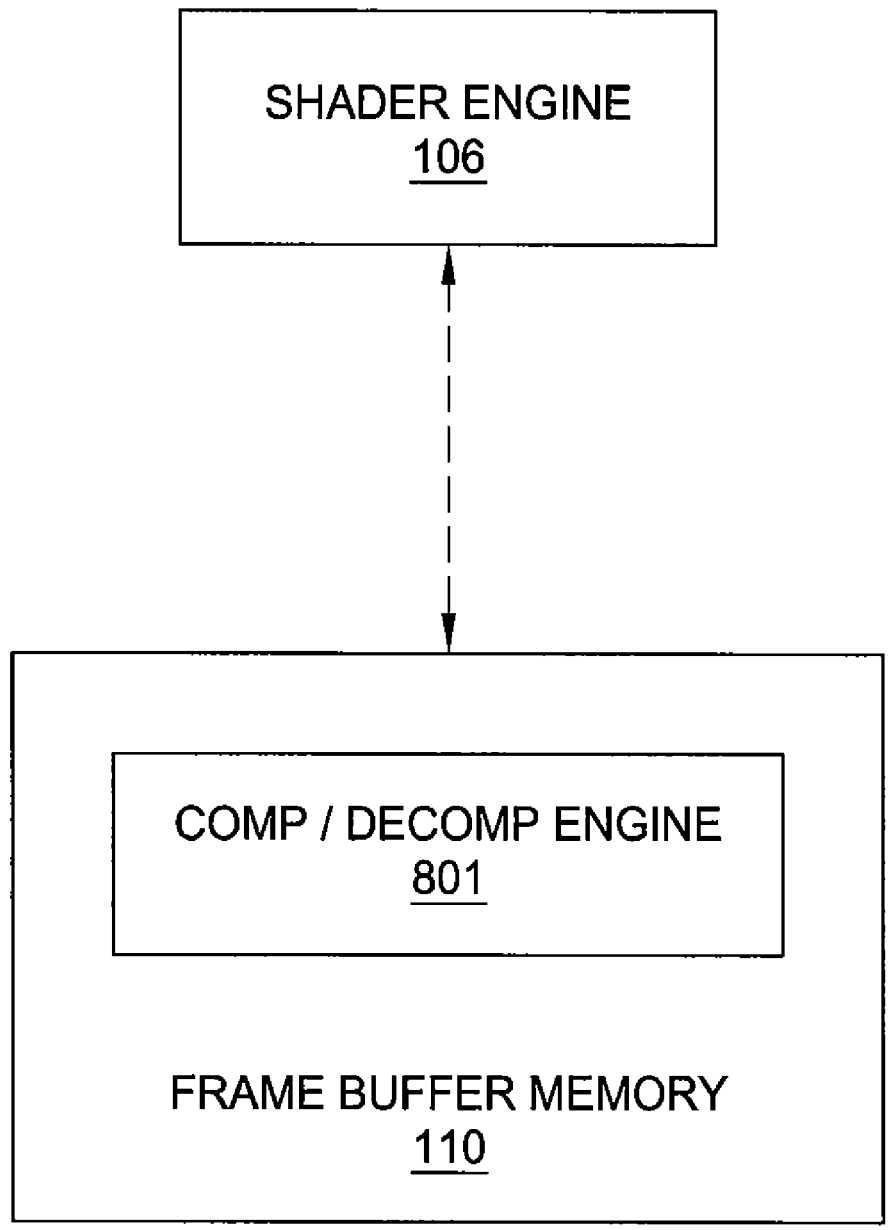
FIG. 8 is a conceptual diagram of graphics rendering pipeline, according to another embodiment of the present invention.

FIG. 8 is a conceptual diagram of the graphics rendering pipeline depicted above in FIGS. 1 and 2, according to another embodiment of the present invention. Here, the shader engine 106 is logically coupled directly to the frame buffer memory 110. The frame buffer memory has an interface that includes at least one compression/decompression engine 801 that is configured to compress and decompress thread group data when executing the STORE or LOAD operations previously described herein. In this implementation, the thread group data received from the shader engine 106 comprises typeless scalar values, meaning that the data is not associated with being color data, depth data or texture data. In such an embodiment, the compression/decompression engine 801 performs the compression and decompression operations described above in conjunction with FIGS. 4-6C.

More specifically, referring back to FIG. 4, the compression/decompression engine 801 would receive the thread group data from the shader engine 106 (step 402), determine whether the thread group is compressible (step 404), compress the thread group data into a subpacket, if the thread group data is compressible (step 406), set a compression tag in the CTAG MEM unit 238 (step 408), and then write the subpacket of thread group data to a memory tile location within a memory partition within the frame buffer memory 110. Similarly, referring back to FIG. 5, the compression/decompression engine 801 would access a compression tag in the CTAG MEM unit 238 (step 502), determine whether the thread group data stored in a memory partition within the frame buffer memory 110 is compressed based on the compression tag (step 504), read a subpacket of thread group data from a memory tile location within the memory partition, if the thread group data is compressed (step 506), decompress the thread group data in the subpacket (step 508), and then route the uncompressed thread group data to the shader engine 106 (step 510).

Referring back now to FIG. 8, in one embodiment, there is a different compression/decompression engine for each memory partition within the frame buffer memory 110. With such a configuration, the crossbar 220 can route uncompressed thread group data between any SM within the shader engine 106 and any memory partition within the frame buffer memory, and that data can then be compressed and stored within the particular memory partition, as previously described herein. Alternative embodiments contemplate any technically feasible arrangement of compression/decompression engines and memory partitions.

One advantage of the disclosed system and method is that an increased memory performance may be achieved when executing STORE or LOAD operations by identifying situations when the threads in a thread group are writing similar scalar values to the frame buffer memory. In such situations, the subunits within the ROP units are configured to compress the scalar data into a form that allows all of the scalar data to be written to or read from the frame buffer memory in one clock cycle instead of several clock cycles, as is required when the data uncompressed.

While the foregoing is directed to embodiments of the present invention, other and further embodiments of the invention may be devised without departing from the basic scope thereof. In particular, the teachings set forth herein may be extended to cover cases where thread group data transmitted to or from a memory partition is compressed such that fewer subpackets may be transmitted than would otherwise be transmitted if the data were not compressed. In such cases, the compressed thread group data can be transmitted in fewer clock cycles than the uncompressed thread group data, thereby increasing overall memory performance when executing STORE or LOAD operations. For example, if a memory tile includes eight subpackets, as depicted in FIG. 3, when thread group data is compressed such that seven or fewer subpackets can be transmitted to a memory partition, instead of eight subpackets when the data is uncompressed, overall memory performance is increased. Thus, the scope thereof is determined by the claims that follow.

I claim:

1. A method for decompressing data for a thread group LOAD operation, the method comprising:
  receiving a request from a shader engine to read thread group data from a memory partition in a frame buffer memory, wherein the thread group data was written to the frame buffer memory by a thread group that includes a plurality of threads executing simultaneously within the shader engine and was compressed into a first number of subpackets and stored in the memory partition, each subpacket representing an amount of data that can be written to the memory partition in one clock cycle, and wherein the thread group data comprises scalar values, and each thread in the thread group wrote either (i) a first scalar value to the frame buffer memory, or (ii) one of the first scalar value or a second scalar value to the frame buffer memory;

determining that the thread group data was compressed into the first number of subpackets based on a compression tag setting; and reading each of the first number of subpackets from the memory partition.

2. The method of claim 1, wherein the first number of subpackets comprises one subpacket.

3. The method of claim 2, wherein each thread in the thread group wrote the first scalar value to the frame buffer memory.

4. The method of claim 3, wherein the one subpacket includes the first scalar value and state information indicating that each thread in the thread group wrote the first scalar value to the frame buffer memory.

5. The method of claim 2, wherein each thread in the thread group wrote either the first scalar value or the second scalar value to the frame buffer memory.

6. The method of claim 5, wherein the one subpacket includes the first scalar value, the second scalar value, and an index for each thread in the thread group, wherein each index is set to indicate whether the thread corresponding to the index wrote the first scalar value or the second scalar value to the frame buffer memory.

7. The method of claim 1, further comprising the steps of decompressing each of the first number of subpackets to produce uncompressed thread group data, and transmitting the uncompressed thread group data to the shader engine.

8. A system for decompressing data for a thread group LOAD operation, the system comprising:

a shader engine; and a frame buffer memory configured to store data processed by the shader engine, wherein the frame buffer memory has an interface that includes a compression/decompression engine configured to:

receive a request from the shader engine to read thread group data from a memory partition in the frame buffer memory, wherein the thread group data was written to the frame buffer memory by a thread group that includes a plurality of threads executing simultaneously within the shader engine and was compressed into a first number of subpackets and stored in the memory partition, each subpacket representing an amount of data that can be written to the memory partition in one clock cycle, and wherein the thread group data comprises scalar values, and each thread in the thread group wrote either (i) a first scalar value to the frame buffer memory, or (ii) one of the first scalar value or a second scalar value to the frame buffer memory, determine that the thread group data was compressed into the first number of subpackets based on a compression tag setting, and read each of the first number of subpackets from the memory partition.

9. The system of claim 8, wherein the first number of subpackets comprises one subpacket.

10. The system of claim 9, wherein each thread in the thread group wrote the first scalar value to the frame buffer memory.

11. The system of claim 10, wherein the one subpacket includes the first scalar value and state information indicating that each thread in the thread group wrote the first scalar value to the frame buffer memory.

12. The system of claim 9, wherein each thread in the thread group wrote either the first scalar value or the second scalar value to the frame buffer memory.

13. The system of claim 12, wherein the one subpacket includes the first scalar value, the second scalar value, and an index for each thread in the thread group, wherein each index is set to indicate whether the thread corresponding to the index wrote the first scalar value or the second scalar value to the frame buffer memory.

14. The system of claim 8, wherein the compression/decompression engine is further configured to decompress each of the first number of subpackets to produce uncompressed thread group data and to transmit the uncompressed thread group data to the shader engine.

15. The system of claim 8, wherein the shader engine includes a plurality of streaming multiprocessors, and the thread group executes on one of the streaming multiprocessors.

16. A computing device configured to decompress data for a thread group LOAD operation, the computing device comprising:

a graphics rendering pipeline that includes a shader engine, and a frame buffer memory configured to store the data processed by the shader engine, wherein the frame buffer memory has an interface that includes at least one compression/decompression engine configured to:

receive a request from the shader engine to read thread group data from a memory partition in the frame buffer memory, wherein the thread group data was written to the frame buffer memory by a thread group that includes a plurality of threads executing simultaneously within the shader engine and was compressed into a first number of subpackets and stored in the memory partition, each subpacket representing an amount of data that can be written to the memory partition in one clock cycle, and wherein the thread group data comprises scalar values, and each thread in the thread group wrote either (i) a first scalar value to the frame buffer memory, or (ii) one of the first scalar value or a second scalar value to the frame buffer memory, determine that the thread group data was compressed into the first number of subpackets based on a compression tag setting, and read each of the first number of subpackets from the memory partition.

* * * * *